(12) United States Patent
Little

(10) Patent No.: US 8,495,103 B2
(45) Date of Patent: Jul. 23, 2013

(54) METHOD AND APPARATUS FOR DETERMINING HOW TO TRANSFORM APPLICATIONS INTO TRANSACTIONAL APPLICATIONS

(75) Inventor: Mark Cameron Little, Ebchester (GB)

(73) Assignee: Red Hat, Inc., Raleigh, NC (US)

( * ) Notice: Subject to any disclaimer, the term of this patent is extended or adjusted under 35 U.S.C. 154(b) by 457 days.

(21) Appl. No.: 12/475,433

(22) Filed: May 29, 2009

(65) Prior Publication Data

US 2010/0306266 A1    Dec. 2, 2010

(51) Int. Cl.
*G06F 17/30* (2006.01)
*G06F 9/44* (2006.01)

(52) U.S. Cl.
USPC .......................................... 707/802; 717/109

(58) Field of Classification Search
None
See application file for complete search history.

(56) References Cited

U.S. PATENT DOCUMENTS

| | | | |
|---|---|---|---|
| 6,597,366 B1 * | 7/2003 | Bennett et al. ................ 345/619 |
| 7,024,656 B1 | 4/2006 | Ahad | |
| 7,100,195 B1 * | 8/2006 | Underwood ..................... 726/2 |
| 7,210,135 B2 | 4/2007 | McCrady et al. | |
| 7,272,820 B2 * | 9/2007 | Klianev ........................ 717/109 |
| 7,451,434 B1 | 11/2008 | Blumenthal et al. | |
| 7,836,436 B2 | 11/2010 | Ringseth et al. | |
| 7,895,582 B2 | 2/2011 | Duffy et al. | |
| 7,913,234 B2 | 3/2011 | Neil et al. | |
| 7,913,236 B2 | 3/2011 | Adl-tabatabai et al. | |
| 8,065,499 B2 | 11/2011 | Dice et al. | |
| 2004/0002906 A1 | 1/2004 | Von Drehnen et al. | |
| 2004/0015851 A1 | 1/2004 | Newhook et al. | |
| 2004/0254881 A1 | 12/2004 | Kumar et al. | |
| 2005/0120036 A1 | 6/2005 | Verma et al. | |
| 2005/0125401 A1 * | 6/2005 | Carr et al. ......................... 707/5 |
| 2006/0136464 A1 | 6/2006 | Rossmann | |
| 2007/0067437 A1 | 3/2007 | Sindambiwe | |
| 2007/0240127 A1 | 10/2007 | Roques et al. | |
| 2009/0037355 A1 * | 2/2009 | Brave et al. ..................... 706/45 |
| 2009/0125519 A1 * | 5/2009 | Robison et al. ................... 707/8 |
| 2009/0276431 A1 | 11/2009 | Lind et al. | |
| 2009/0313603 A1 | 12/2009 | Tendler et al. | |
| 2009/0319739 A1 | 12/2009 | Shpeisman et al. | |
| 2009/0327636 A1 | 12/2009 | Detlefs et al. | |

OTHER PUBLICATIONS

Guandong et al, "A Web Recommendation Technique Based on Probabilistic Latent Semantic Analysis", Sep. 21, 2005.*
"JBoss Transactions 4.2.3, JTS Programmers Guide", © 2006, 117 pages.
USPTO Notice of Allowance for U.S. Appl. No. 12/475,429 mailed Dec. 14, 2012.
USPTO Office Action for U.S. Appl. No. 12/475,429 mailed Jul. 5, 2012.

(Continued)

*Primary Examiner* — Tarek Chbouki
(74) *Attorney, Agent, or Firm* — Lowenstein Sandler LLP

(57) ABSTRACT

A computing device monitors an application that includes at least one object over a time period. The computing device identifies a usage pattern of the at least one object over the time period. The computing device recommends, based on the usage pattern, at least one of a) that the at least one object be converted to a transactional object and b) a locking strategy for the at least one object.

19 Claims, 5 Drawing Sheets

OTHER PUBLICATIONS

Cobb, Edward E., "The Impact of Object Technology on Commercial Transaction Processing," IBM Corporation, 1996, pp. 174-190.

Herlihy, Maurice, et al., "Transactional Boosting: A Methodology for Highly-Concurrent Transaction Objects," Computer Science Department, Brown University, 2008, pp. 2-5.

Sandholm, Thomas, "Object Caching in a Transactional, Object-Relational CORBA Environment," Department of Computer Systems Sciences University of Stockholm, 1998, pp. 7-10 and 55-64 (80 pages total).

"JBoss Transactions 4.2.3, JTS Programmers Guide," JBoss, Inc., 2006, 117 pages.

Johnson, Rod, et al., "Spring java/j2ee Application Framework, The Spring Framework—Reference Documentation," Version 2.5.6, 2004-2006, 590 pages.

* cited by examiner

METHOD AND APPARATUS FOR DETERMINING HOW TO TRANSFORM APPLICATIONS INTO TRANSACTIONAL APPLICATIONS

TECHNICAL FIELD

Embodiments of the present invention relate to distributed transactions, and more specifically to monitoring applications, and determining whether objects within the applications should be transactional objects and/or whether a locking strategy of the objects should be changed.

BACKGROUND

Distributed transactions are often performed on distributed computing systems. A distributed transaction is a set of operations that update shared resources. Distributed transactions must satisfy the properties of Atomicity, Consistency, Isolation and Durability, known commonly as the ACID properties. According to the Atomicity property, either the transaction successfully executes to completion, and the effects of all operations are recorded, or the transaction fails. The Consistency property requires that the transaction does not violate integrity constraints of the shared resources. The Isolation property requires that intermediate effects of the transaction are not detectable to concurrent transactions. Finally, the Durability property requires that changes to shared resources due to the transaction are permanent.

After an application has been compiled and deployed, an administrator may determine that the application should be transactional. The administrator then modifies the source code of the application to make objects within the application transactional. A transactional object is defined herein as an object that can participate in transactions. A transactional object may include semantics for participating in transactions, such as methods for rolling back and committing state changes associated with a transaction. Making an object transactional can add significant overhead to the object. However, it can be difficult to identify which of the application's objects should be made transactional. If everything in the application is accessed transactionally (e.g., all objects are made transactional), then it is guaranteed that there are transactional semantics in place to recover the objects. Accordingly, all of the application's objects are often made transactional to provide maximum safety and recoverability.

There are different locking strategies that can be used for a transactional object. For example, a transactional object can be configured to request read locks or to request write locks. Write locks require more overhead than read locks, but provide added safety. It can be difficult to identify what locking strategy should be used for each object in an application. Since write locks are the safest locks, often all of the objects are given a locking strategy that implements write locks.

When an application is made transactional, each of the objects in the application are often made into transactional objects that request write locks, incurring a maximum possible added overhead. This happens despite the fact that often only some of the objects included in the application actually need to be made transactional, and of those, only some of the objects need write locks.

BRIEF DESCRIPTION OF THE DRAWINGS

The present invention is illustrated by way of example, and not by way of limitation, in the figures of the accompanying drawings and in which.

DETAILED DESCRIPTION

Figure 1A:
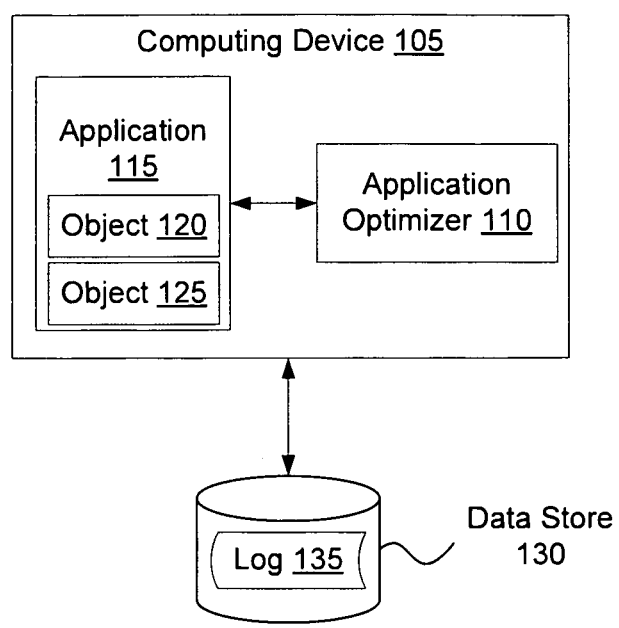
FIG. 1A illustrates an exemplary computing device connected to a data store, in accordance with one embodiment of the present invention.

Described herein is a method and apparatus for determining how to transform an application into a transactional application. In one embodiment, a computing device monitors an application that includes one or more objects over a time period. The computing device identifies a usage pattern of the one or more objects over the time period. The computing device recommends, based on the usage pattern, at least one of a) that the object or objects be converted to a transactional object and b) a locking strategy for the object or objects. The recommendation may be reported to a user via a graphical user interface. Additionally, or alternatively, the recommendation may be used to automatically modify the object and/or a class from which the object inherits to transform the object into a transactional object and/or to change a locking strategy of the object.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "intercepting", "recording", "performing", "determining", "receiving", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

FIG. 1A illustrates an exemplary computing device 105 connected to a data store 130, in accordance with one embodiment of the present invention. The computing device 105 may be, for example, a personal computer (PC), palm-sized computing device, personal digital assistant (PDA), etc. Computing device 105 may be a single machine, or may include multiple interconnected machines (e.g., machines configured in a cluster). The computing device 105 may be configured as a server, a client, a database, and so on.

The computing device 105 may be a component of a computer system that includes a service oriented architecture (SOA) (an information system architecture that organizes and uses distributed capabilities (services) for one or more applications). An SOA provides a uniform means to offer, discover, interact with and use capabilities (services) distributed over a network. Through the SOA, applications (e.g., application 115) may be designed that combine loosely coupled and interoperable services. In one embodiment, the distributed computing system includes an enterprise service bus (ESB). An ESB is an event-driven and standards-based messaging engine that provides services for more complex architectures. The ESB provides an infrastructure that links together services and clients to enable distributed applications and processes. The ESB may be implemented to facilitate an SOA. In one embodiment, the ESB is a single bus that logically interconnects all available services and clients. Alternatively, the ESB may include multiple busses, each of which may logically interconnect different services and/or clients.

Computing device 105 includes an application 115 and an application optimizer 110. In one embodiment, application 115 is a service or other functionality that is available to clients in an SOA. In another embodiment, application 115 is a client application that accesses services. Application 115 may have been written in an object oriented programming language such as Java, C++, etc. In one embodiment, application 115 has been written using aspect oriented programming techniques.

Application 115 is structured as a collection of interrelated objects (e.g., object 120 and object 125). Each object is a component of the application 115 that performs a specific set of related behaviors. Each object may be a self-sufficient module that contains all the information necessary to manipulate its own data structure. Objects (e.g., object 120 and object 125) are capable of receiving messages, processing data, and sending messages to other objects of the same or different applications, and can be viewed as independent machines with distinct roles or responsibilities.

Application 115 may or may not be a transactional application (e.g., an application that can participate in transactions). If application 115 is a transactional application, then one or both of object 120 and object 125 are transactional objects. Each transactional object has a locking strategy. The locking strategy designates when the object will request locks and the type of locks that the transactional object will request. The object may request locks, for example, for data items accessed by the object and/or for the object when its state is accessed or its methods are called. One possible locking strategy implements read locks on all data items of the object that are accessed. Read locks enable there to be concurrent readers, so that fields and data items of the object can be read concurrently by multiple different clients within the context of different transactions. Another possible locking strategy implements write locks on all fields/data items of the object that are accessed. Write locks guarantee exclusive access to a data item by a single client or process. Therefore, no other applications or objects may access or modify the data item until the transaction is finished. In another locking strategy, an object 120, 125 first requests a read lock, and then switches the read lock to a write lock once the object is ready to modify the data item. Other locking strategies use type specific locks, which permit different clients to obtain locks on different portions of data items rather than on entire data items. Type specific locks enable concurrent writers because they guarantee that no two writers will write to the same portion of a data item.

Application 115 may have a universal locking strategy that applies to both object 120 and object 125. Alternatively, object 120 and object 125 may have different locking strategies. Moreover, a locking strategy may implement different locks on different data items or fields of an object. For example, object 120 may include a locking strategy that implements read locks on documents and write locks on log files. Other locking strategies are also possible.

If application 115 is not transactional, at some point it may become necessary to make it transactional. Moreover, if application 115 is transactional, some objects 120, 125 may not be transactional that should be transactional and/or some objects 120, 125 that are transactional should not be transactional. Additionally, the locking strategies for objects that are transactional may not be optimal. For example, a particular locking strategy may be okay when the number of concurrent readers and writers is small. However, as the application 115 scales up in size, the locking strategy may become inefficient, or even become a bottleneck for a transaction. As the number of users increases, the workload increases (e.g., the number of threads running within the computing device 105 increases). This could cause many adverse effects, and cause the system to grind to a halt due to the chosen locking strategies. In one embodiment, these problems are addressed by application optimizer 110.

Application optimizer 110 monitors application 115 and/or additional applications (not shown) running on computing device 105. Based on the monitoring, application optimizer identifies usage patterns of object 120 and object 125. The usage patterns can be patterns of how the objects 120, 125 use data items, how data items/fields of the objects 120, 125 are accessed, how the objects 120, 125 communicate with each other and/or other objects or other applications, etc. The application optimizer 110 can then recommend that one or both of object 120 and object 125 be transactional objects. The application optimizer 110 can also recommend specific locking strategies for the objects 120, 125. In one embodiment, application optimizer 110 dynamically modifies objects 120, 125 to make them transactional or not transactional and/or to change a locking strategy. The application optimizer is discussed in greater detail below with reference to FIG. 1B.

In one embodiment, computing device 105 is coupled with a data store 130. Data store 130 may include a file system, a database, or other data storage arrangement. In one embodiment, data store 130 is internal to computing device 105. Alternatively, data store 130 may be external to computing device 105, and connected with computing device 105 either directly or via a network. In one embodiment, application optimizer 110 stores logs 135 that include information on the usage patterns of the objects 120, 125 within data store 130.

Figure 1B:
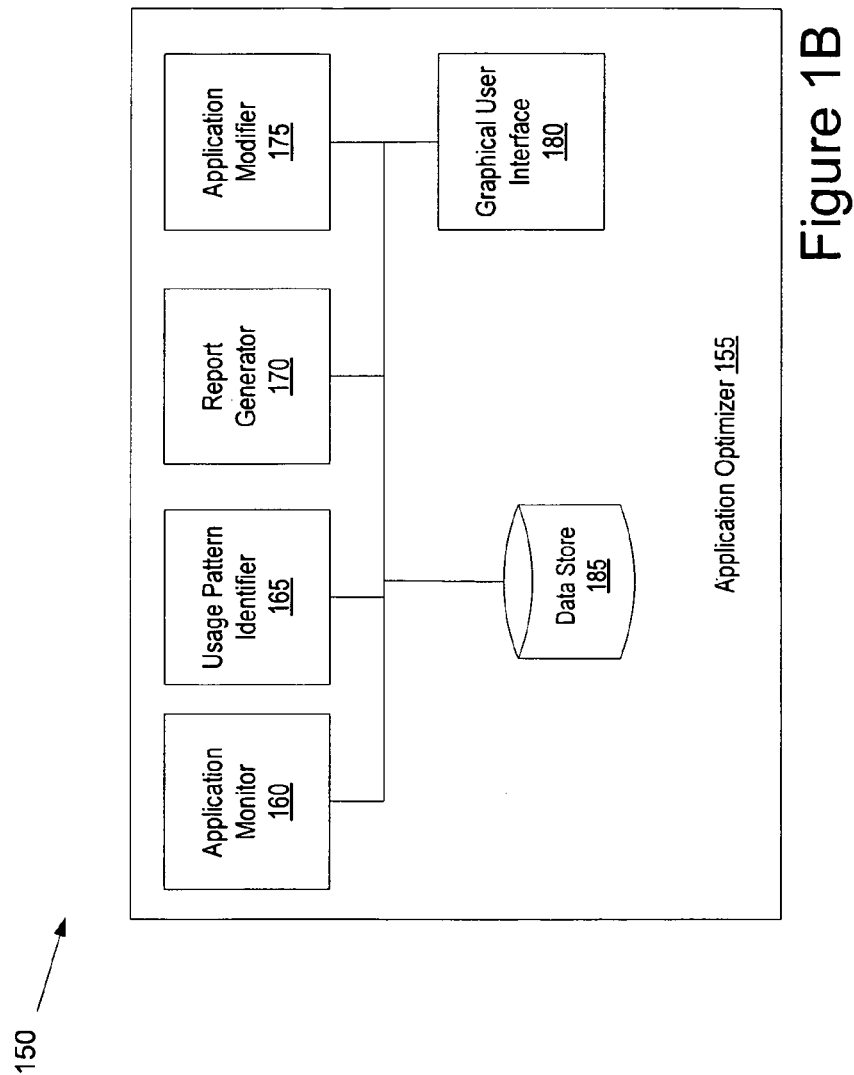
FIG. 1B is a block diagram of one embodiment of an application optimizer.

FIG. 1B is a block diagram of one embodiment of an application optimizer 155. The application optimizer 155 in one embodiment corresponds to application optimizer 110 of FIG. 1A. The application optimizer 155 may include an application monitor 160, a usage pattern identifier 165, a report generator 170, an object modifier 175, one or more data stores 185, and/or any other components.

Application monitor 160 monitors applications over time. In one embodiment, the application monitor 160 monitors one designated application at a time. In another embodiment, application monitor 160 monitors multiple applications concurrently. For example, application monitor 160 may monitor all applications that are hosted by a computing device that hosts application optimizer 155. Application monitor 160 may monitor applications continuously. Alternatively, application monitor 160 may monitor one or more applications for a predetermined time period (e.g., 2 days, 1 week, 1 month, etc.), or until a specified amount of data is gathered (e.g., until a statistically significant amount of data is obtained).

The application monitor 160 may monitor both transactional applications and non-transactional applications. For transactional applications, application monitor 160 may monitor access on objects and data items within a transactional context and/or outside of a transactional context.

In one embodiment, application monitor 160 tracks every resource that is used in the monitored applications, including the objects that were written for the application, and anything that it uses externally, such as databases, message systems, third party components (e.g., an RPC mechanism), etc. The application monitor 160 may separately track each object within an application. In one embodiment, application monitor 160 monitors accesses on objects and accesses by objects to data items. Accesses on objects may include, for example, requests to read a state of one or more variables of the object, requests to execute one or more methods of the object, etc. The application monitor 160 may also monitor, for example, how objects interact with other objects and/or applications, how objects interact with a database, how objects interact with clients, and so on.

In one embodiment, application monitor 160 monitors applications that are executed in a Java virtual machine. Application optimizer 155 may cause the byte code of any application that is executed on the Java virtual machine to be modified at run time so that the application reports every action (e.g., every execution of methods, every request to access states of objects in the application, and so on) to the application monitor 160. Application optimizer 155 in one embodiment ties in to an instrumentation API of the Java virtual machine. When an application that the application monitor 160 is to monitor is run, the Java virtual machine will inform the automatically inform the application monitor 160 whenever something happens (e.g., whenever a method is invoked, a data item is modified, a thread is created, etc.).

Application monitor 160 may maintain a log of activities relating to monitored applications in data store 185 and/or may report such activities to usage pattern identifier 165 as they occur. In one embodiment, data obtained by the application monitor 160 is raw data that can indicate, for example, data items accessed by specific objects at specific times, specific calls to read a state of an object or to perform a method of an object at specific times, etc.

Usage pattern identifier 165 receives data collected by the application monitor 160 either directly from application monitor 160 or from data store 185. Usage pattern identifier 165 analyzes the data, and identifies usage patterns of the objects. Usage patterns may include a number of requests to access objects per minute, per hour, etc. Usage patterns may include such information as maximum, minimum, average and median number of concurrent read requests on an object, concurrent write requests on an object and total concurrent requests on an object. Usage patterns may also include such information on specific fields of the object (e.g., average concurrent write requests to a specific field of an object). Usage patterns may include information on how frequently objects request write locks shortly after requesting read locks. Usage patterns may also include statistics on where access requests are originating from, when access requests are made, how often an object uses external resources, whether and how frequently an object communicates with other objects, whether and how frequently an object communicates with other applications, and so on.

From the identified usage pattern, usage pattern identifier 165 can determine what objects need to be transactional and what objects don't need to be transactional. Usage pattern identifier 165 may determine that an ordinary object should be a transactional object, for example, if multiple requests to read and/or write are received by the object concurrently. Usage pattern identifier 165 may also make a determination that an object needs to be transactional if there are concurrent accesses to data that is being stored in a database, or if the object is using a message service and sending messages to another object. The identified usage pattern may indicate that a transactional object should be an ordinary object, for example, if a state of the object is never modified, or if the object does not need to be recovered in the event of failure.

In another example, an object that has immutable data (data that never changes) would not need to be a transactional object. An object that is changed once when a system starts, and then changed again only when rebooted would not need to be a transactional object. Objects that are only ever read and never used in conjunction with objects that are modified also would not need to be transactional. An object that uses one durable object that is maintained in a database, and only ever uses the one durable object, would not need to be transactional because the database already performs any necessary transactional work. An application that does not need multiple different objects to be changed together would not need to be transactional.

Usage pattern identifier 165 in one embodiment determines a locking strategy to use for the objects of monitored applications. Different strategies may be used for different objects. Additionally, different strategies may be used for different data items used by a single object or fields of the object. The usage pattern identifier 165 may identify, for example, that an object has write locks specified, but never had more than one user on them at one time. The usage pattern identifier 165 could determine from this data that a change from a write lock to a read lock is appropriate. Alternatively, the usage pattern identifier 165 may find that frequently while a client had a read lock set on an object, lots of other clients had requested write locks on the object. Based on this information, the usage pattern identifier may determine that the read locks should either be removed or modified to write locks.

In an example, some objects use the isolation property of transactions to get isolation by setting write locks, but are not interested in whether there are any state changes to the object. Such objects may ask for a write lock even though don't really need one, purely so they will have exclusive access to the object during the transaction (e.g., to prevent concurrent threads from viewing the state of a particular object until that transaction has ended). However, there is significantly more overhead on getting a write lock then on getting a read lock. If write locks are used purely to provide exclusive access to an object, the usage pattern identifier 165 might find that a write lock is being set, and no one else is ever interested in the object (e.g., no other objects refer to it, no other clients that ever talk to it). Therefore, setting a write lock is detrimental to performance for no good reason. The usage pattern identifier 165 may therefore determine that a read lock is more appropriate, or that no lock should be used, or even that the object should not be transactional.

In another example, an object may use a locking strategy in which it first requests a read lock, and then switches the read lock to a write lock once the object is ready to modify a data item. However, switching from the read lock to the write lock is associated with a certain performance overhead. If no other objects or applications are likely to request a read lock, then the act of lock upgrading (switching from the read lock to a write lock) is unnecessary. In such an instance, the usage pattern identifier 165 may determine that the read lock should be modified to a write lock to improve efficiency.

In one embodiment, usage pattern identifier 165 includes separate criteria for determining that an application should be transactional, for determining that an object should be transactional, for determining that an application should not be transactional, and for determining that an object should not be transactional. The usage pattern identifier 165 may also include separate criteria for each locking strategy. For example, if first transaction criteria requiring that there be no concurrent read or write requests on an object is satisfied, the usage pattern identifier may determine that an object should not be transactional. Alternatively, if second transaction criteria requiring that at least two read requests are received within a specified period of time is satisfied, a read lock may be suggested.

In one embodiment, the usage pattern identifier 165 sends recommendations on whether objects should be transactional and locking strategies to use for the objects to one or both of report generator 170 and application modifier 175. Usage pattern identifier 165 may also store the recommendations in data store 185.

In one embodiment, report generator 170 generates a report based on the usage patterns identified by usage pattern identifier 165. Report generator 170 may correlate the data received from usage pattern identifier 165 and format it in a meaningful way. The report may be formatted so that a user can find out what is going on with each of the applications and objects just by looking at report. For example, a report may show that there were three threads trying to access a particular object at a particular point, that there were two calls to a database by the object at the particular point, that the object accessed two other objects at this point, etc.

The report may include the recommendations received from usage pattern identifier 165. In one embodiment, report generator 170 sends the report to graphical user interface 180 to be presented to a user. The report may be presented as a line graph, pie chart, bar graph, three dimensional graph, histogram, and so on. Report generator 170 may also store the report in data store 185.

In one embodiment, application modifier 175 modifies one or more objects of a monitored application based on the identified usage patterns. For example, if an object is configured to request a read lock, the application optimizer 110 may modify the object so that it requests a write lock instead. If an object accessing the data item is not transactional, the application optimizer 110 may modify the code so that it is transactional.

Application modifier 175 may dynamically modify the behavior of objects and/or applications based on the recommendations received from usage pattern identifier 165 (e.g., in response to the identified usage pattern). In one embodiment, the applications to be modified are tied into a dynamic system, so that a locking behavior and transactional behavior can be changed dynamically based on a recommendation from usage pattern identifier 165 without requiring a user to change source code and recompile the application (e.g., the application may be designed to be able to turn on or off different types of locks). In one embodiment, the application has been generated such that a configuration file of the application can be modified to adjust the locking policy of each object and whether or not each object is transactional.

In one embodiment, the application modifier 175 changes the locking strategy of the objects and/or makes the objects into transactional or non-transactional objects without modifying the code of the classes that the objects inherit from. This may be beneficial, for example, if the source code for the class is not available. In one embodiment, the application optimizer 110 makes the objects transactional and/or changes the locking policy for the objects using a transactional object container.

The transactional object container receives an object at runtime of a compiled application. When an object is placed in the transactional object container, the transactional object container creates a new object, referred to herein as a transactional proxy, for that object placed within the transactional object container. The transactional proxy inherits fields and/or methods from the transactional object container, and also retains any methods and/or fields of the object that it has been generated from. The transactional proxy includes transactional logic, a transactional marker and one or more pointers to the object. The transactional proxy is passed to the application. The application can then make calls on the transactional proxy instead of on the object. The transactional proxy can perform transactional functions, and forward the calls to the original object.

In one embodiment, when it is determined that an application should be transactional, application modifier 175 first makes all objects within the application transactional with write locks. As additional data is gathered by application monitor 160 and analyzed by usage pattern identifier 165, application modifier 175 then further adjusts the objects by making them non-transactional and/or by changing the locking strategy for them.

Figure 2A:
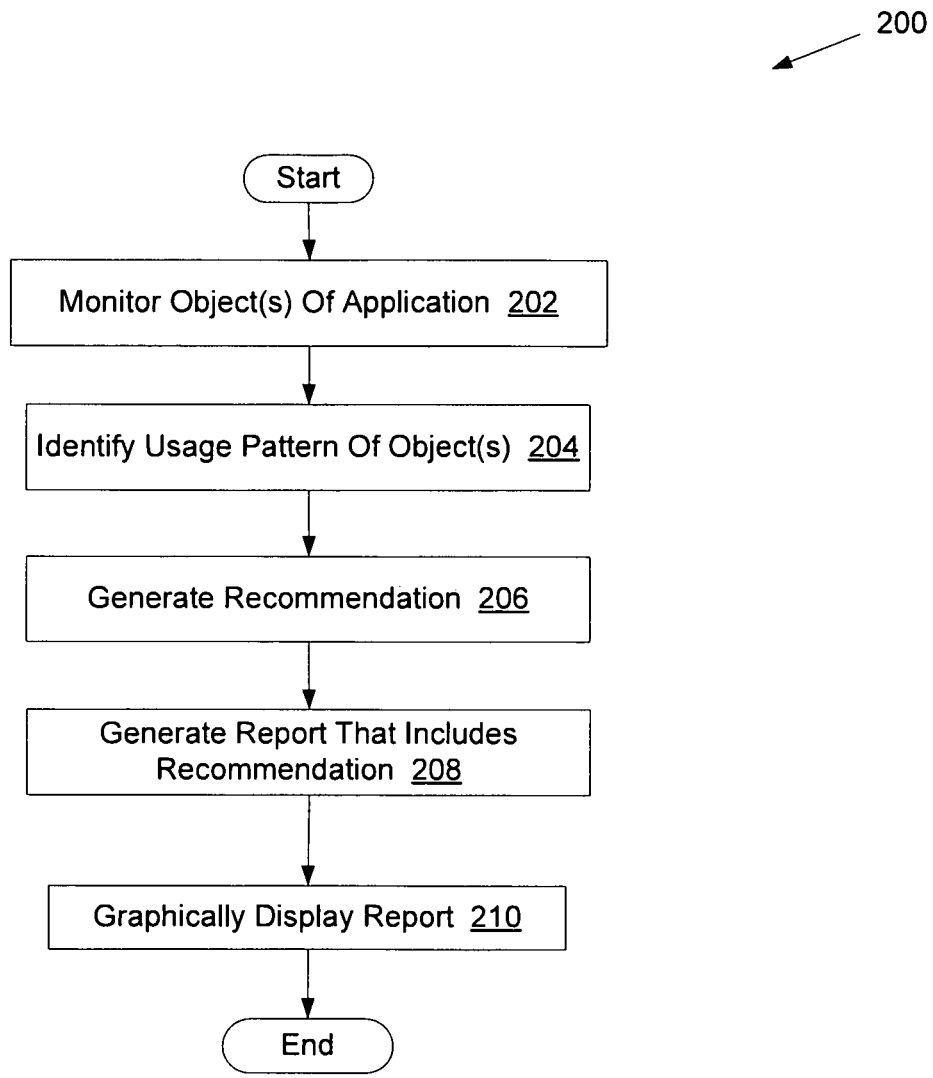
FIG. 2A illustrates a flow diagram of one embodiment for a method of determining whether an object should be a transactional object.

FIG. 2A illustrates a flow diagram of one embodiment for a method 200 of determining whether an object should be a transactional object. The method is performed by processing logic that comprises hardware (e.g., circuitry, dedicated logic, programmable logic, microcode, etc.), software (such as instructions run on a processing device), or a combination thereof. In one embodiment, method 200 is performed by application optimizer 110 of FIG. 1A.

Referring to FIG. 2A, at block 202 of method 200 an application optimizer monitors one or more objects of an application. The application optimizer may monitor access to the object by clients, applications and/or other objects. The application optimizer may also monitor accesses to other objects and data items by the object.

At block 204, the application optimizer identifies usage patterns of the one or more objects. The usage patterns can be patterns of how the objects 120, 125 use data items, how data items or fields of the objects 120, 125 are accessed, how the objects 120, 125 communicate with each other and/or other objects or other applications, etc.

At block 206, the application optimizer generates recommendations for the objects. In one embodiment, the identified usage patterns are compared to one or more transaction criteria. The application optimizer may then generate the recommendations based on which transaction criteria are met by the usage patterns.

At block 208, the application optimizer generates a report that includes the recommendations. The report may be a graph, table, chart, or other arrangement of data. At block 210, the application optimizer graphically displays the report. The method then ends.

Figure 2B:
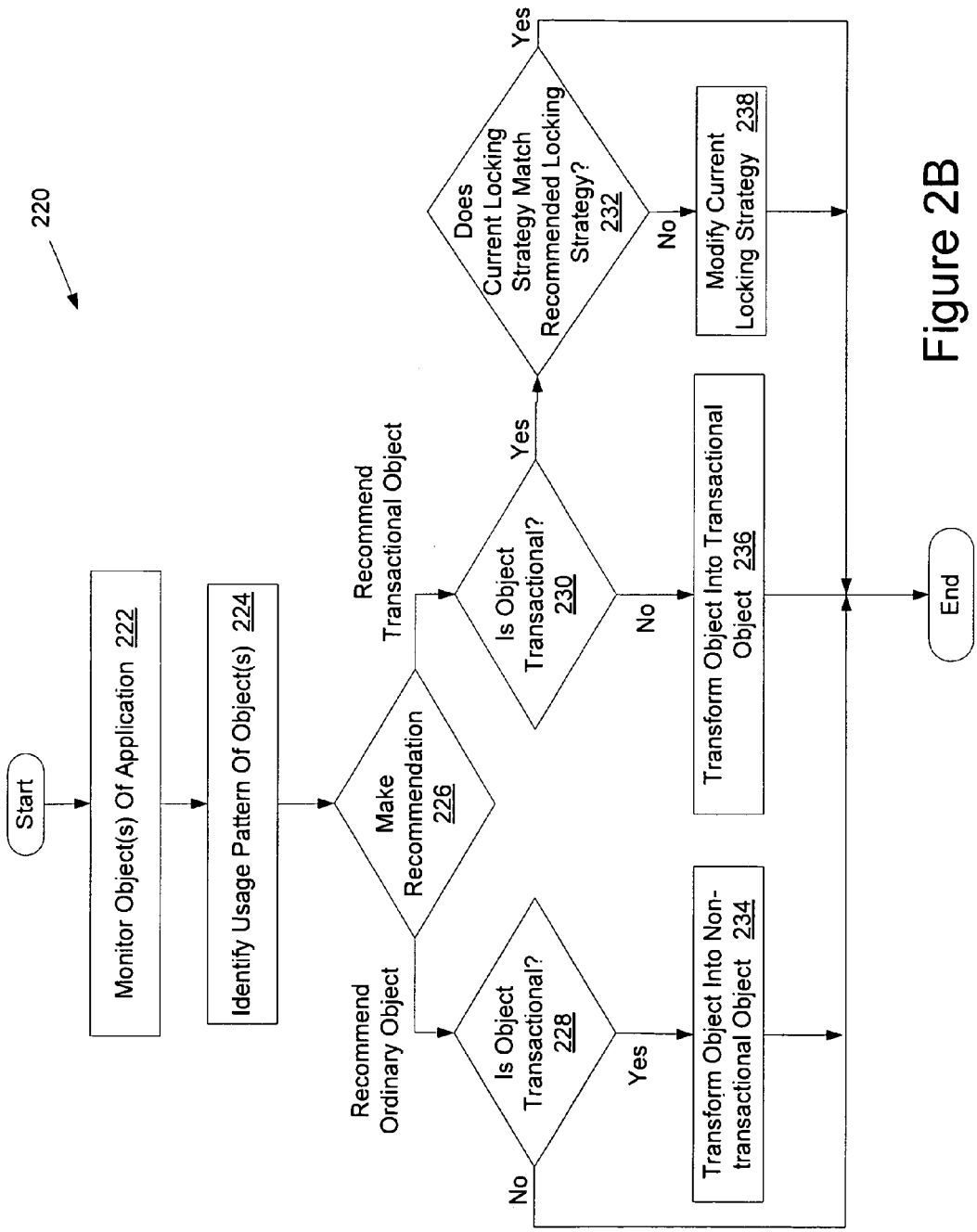
FIG. 2B illustrates a flow diagram of another embodiment for a method of determining whether an object should be a transactional object.

FIG. 2B illustrates a flow diagram of another embodiment for a method 220 of determining whether an object should be a transactional object. The method is performed by processing logic that comprises hardware (e.g., circuitry, dedicated logic, programmable logic, microcode, etc.), software (such as instructions run on a processing device), or a combination thereof. In one embodiment, method 220 is performed by application optimizer 110 of FIG. 1A.

Referring to FIG. 2B, at block 222 of method 220 an application optimizer monitors one or more objects of an application. At block 224, the application optimizer identifies usage patterns of the one or more objects.

At block 226, the application optimizer generates recommendations for the objects. The application optimizer may recommend that the object be a transactional object or that the object be a non-transactional object. The application optimizer may also recommend a locking strategy to use for the object. If the application optimizer recommends that the object be an ordinary (non-transactional) object, the method proceeds to block 228. If the application optimizer recommends that the object be a transactional object, the method proceeds to block 230.

At block 228, the application optimizer determines whether the object is presently a transactional object. If the object is not a transactional object, the method ends. If the object is a transactional object, then the method continues to block 234, and the object is transformed from a transactional object into a non-transactional object. In one embodiment, a configuration file of the application is modified to modify the object from a transactional object into a non-transactional object. Alternatively, a transactional object container may be used to make the modification.

At block 230, the application optimizer determines whether the object is presently a transactional object. If the object is not a transactional object, the method continues to block 236. If the object is a transactional object, then the method continues to block 232.

At block 236, the application optimizer transforms the object into a transactional object (e.g., by changing a configuration file for the object or by using a transactional container for the object). The method then ends.

At block 232, the application optimizer determines whether a current locking strategy for the object matches the recommended locking strategy. If the locking strategy does match the recommended locking strategy, then the method ends. If the locking strategy does not match the recommended locking strategy, then the method continues to block 238.

At block 238, the current locking strategy is modified so that it corresponds to the recommended locking strategy (e.g., by changing a configuration file for the object or by using a transactional container for the object). The method then ends.

Figure 3:
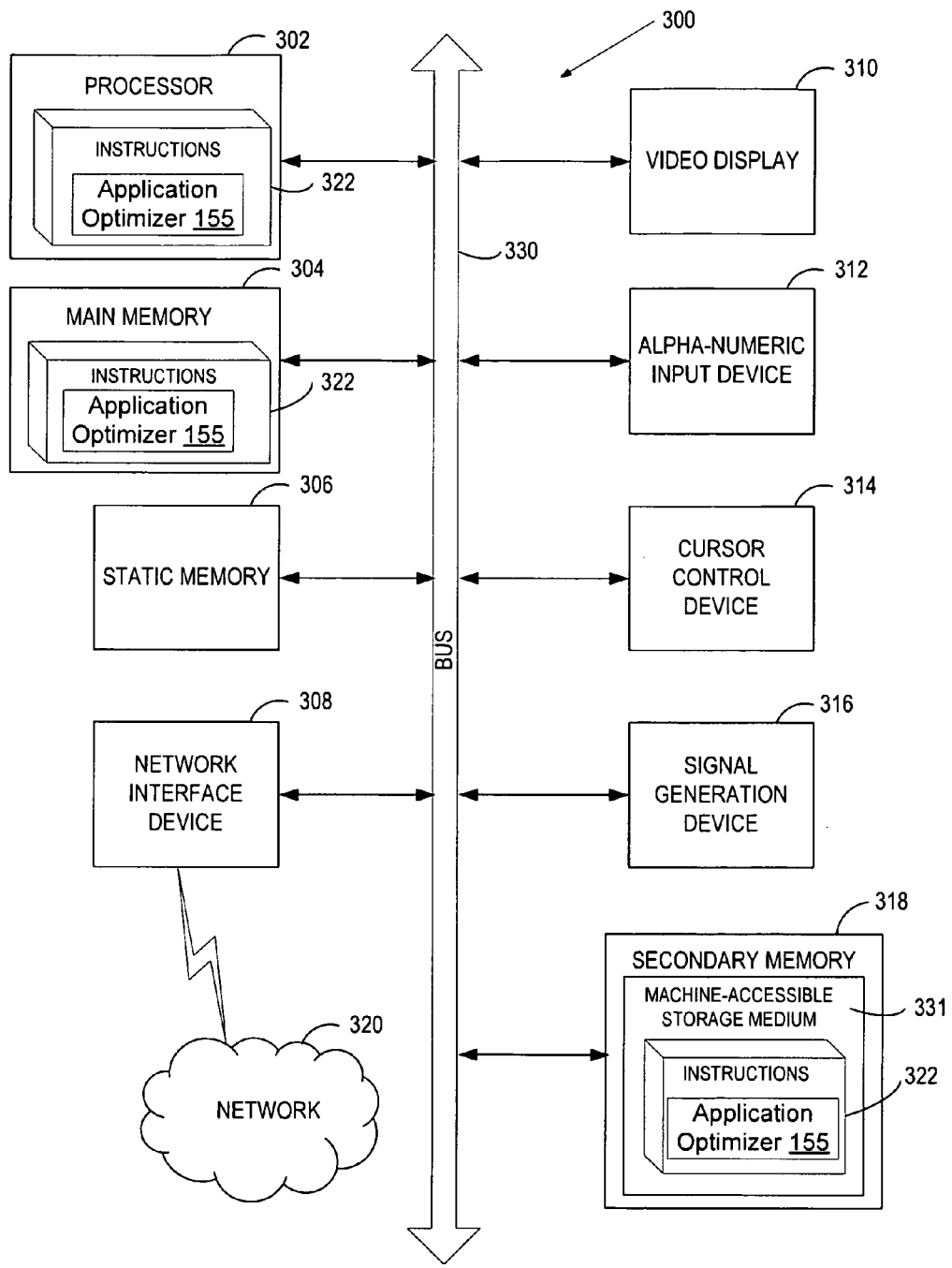
FIG. 3 illustrates a block diagram of an exemplary computer system, in accordance with one embodiment of the present invention.

FIG. 3 illustrates a diagrammatic representation of a machine in the exemplary form of a computer system 300 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 300 includes a processing device 302, a main memory 304 (e.g., read-only memory (ROM), flash memory, dynamic random access memory (DRAM) such as synchronous DRAM (SDRAM) or Rambus DRAM (RDRAM), etc.), a static memory 306 (e.g., flash memory, static random access memory (SRAM), etc.), and a secondary memory 318 (e.g., a data storage device), which communicate with each other via a bus 330.

Processing device 302 represents one or more general-purpose processing devices such as a microprocessor, central processing unit, or the like. More particularly, the processing device 302 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 302 may also be one or more special-purpose processing devices such as an application specific integrated circuit (ASIC), a field programmable gate array (FPGA), a digital signal processor (DSP), network processor, or the like. Processing device 302 is configured to execute instructions 322 for performing the operations and steps discussed herein.

The computer system 300 may further include a network interface device 308. The computer system 300 also may include a video display unit 310 (e.g., a liquid crystal display (LCD) or a cathode ray tube (CRT)), an alphanumeric input device 312 (e.g., a keyboard), a cursor control device 314 (e.g., a mouse), and a signal generation device 316 (e.g., a speaker).

The secondary memory 318 may include a machine-readable storage medium (or more specifically a computer-readable storage medium) 331 on which is stored one or more sets of instructions 322 embodying any one or more of the methodologies or functions described herein. The instructions 322 may also reside, completely or at least partially, within the main memory 304 and/or within the processing device 302 during execution thereof by the computer system 300, the main memory 304 and the processing device 302 also constituting machine-readable storage media. The software 322 may further be transmitted or received over a network 320 via the network interface device 308.

The machine-readable storage medium 331 may also be used to store application optimizer 155 of FIG. 1B, and/or a software library containing methods that call an application optimizer. While the machine-readable storage medium 331 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A computer implemented method, comprising:
monitoring an application by a computing device, the application comprising a non-transactional object that lacks semantics to participate in transactions;
identifying, by the computing device, a usage pattern of the non-transactional object;
making a determination, based on the usage pattern, that the non-transactional object satisfies one or more transaction criteria; and
responsive to making the determination, changing the non-transactional object during runtime of the application to cause the non-transactional object to become a transactional object, wherein the changing is performed without modifying code of a class from which the non-transactional object inherits.

2. The method of claim 1, further comprising:
generating a report that illustrates the usage pattern of the non-transactional object, the report comprising a recommendation to change the non-transactional object into the transactional object; and
graphically displaying the report.

3. The method of claim 1, wherein the transaction criteria comprise at least one of concurrent access attempts by the non-transactional object and another object to a data item, concurrent attempts to access the non-transactional object, use of a message service by the non-transactional object, or interaction with an additional object by the non-transactional object.

4. The method of claim 1, wherein the non-transactional object is modified using a transactional container that acts as a proxy for the at least one non-transactional object and that performs transaction related functions for the non-transactional object.

5. The method of claim 1, the method further comprising:
recommending, based on the usage pattern, a locking strategy for the transactional object; and
modifying a current locking strategy of the transactional object responsive to a determination that the current locking strategy is different from the recommended locking strategy.

6. The method of claim 5, wherein modifying the current locking strategy comprises changing the current locking strategy from a read lock to a write lock or changing the current locking strategy from a write lock to a read lock.

7. The method of claim 1, further comprising:
maintaining a log associated with the non-transactional object based on the monitoring;
wherein the usage pattern of the non-transactional object is identified based on the log, the usage pattern being over a time period.

8. A non-transitory computer-readable storage medium having instructions that, when executed by a processing device, cause the processing device to perform operations comprising:
monitoring an application by the processing device, the application comprising a non-transactional object that lacks semantics to participate in transactions;
identifying, by the processing device, a usage pattern of the non-transactional object;
making a determination, based on the usage pattern, that the non-transactional object satisfies one or more transaction criteria; and
responsive to making the determination, changing the non-transactional object during runtime of the application to cause the non-transactional object to become a transactional object, wherein the changing is performed without modifying code of a class from which the non-transactional object inherits.

9. The non-transitory computer-readable storage medium of claim 8, the operations further comprising:
generating a report that illustrates the usage pattern of the at least one non-transactional object, the report comprising a recommendation to change the non-transactional object into the transactional object; and
graphically displaying the report.

10. The non-transitory computer-readable storage medium of claim 8, wherein the transaction criteria comprise at least one of concurrent access attempts by the non-transactional object and another object to a data item, concurrent attempts to access the non-transactional object, use of a message service by the non-transactional object, or interaction with an additional object by the non-transactional object.

11. The non-transitory computer-readable storage medium of claim 8, wherein the non-transactional object is modified using a transactional container that acts as a proxy for the non-transactional object and that performs transaction related functions for the non-transactional object.

12. The non-transitory computer-readable storage medium of claim 8, the operations further comprising:
recommending, based on the usage pattern, a locking strategy for the transactional object; and modifying a current locking strategy of the transactional object responsive to a determination that the current locking strategy is different from the recommended locking strategy.

13. The non-transitory computer-readable storage medium of claim 12, wherein modifying the current locking strategy comprises changing the current locking strategy from a read lock to a write lock or changing the current locking strategy from a write lock to a read lock.

14. A computing apparatus, comprising:
a memory comprising instructions for an application optimizer; and
a processing device, connected with the memory, to execute the instructions, wherein the instructions cause the processing device to:
monitor an application that includes a non-transactional object that lacks semantics to participate in transactions;
identify a usage pattern of the non-transactional object;
make a determination, based on the usage pattern, that the non-transactional object satisfies one or more transaction criteria; and
responsive to making the determination, change the non-transactional object during runtime of the application to cause the non-transactional object to become a transactional object, wherein the change is performed without modifying code of a class from which the non-transactional object inherits.

15. The computing apparatus of claim 14, the instructions further to cause the processing device to:
generate a report that illustrates the usage pattern of the non-transactional object, the report comprising a recommendation to change the non-transactional object into the transactional object; and
graphically display the report.

16. The computing apparatus of claim 14, wherein the transaction criteria comprise at least one of concurrent access attempts by the non-transactional object and another object to a data item, concurrent attempts to access the non-transactional object, use of a message service by the non-transactional object, or interaction with an additional object by the non-transactional object.

17. The computing apparatus of claim 14, wherein the non-transactional object is modified using a transactional container that acts as a proxy for the non-transactional object and that performs transaction related functions for the non-transactional object.

18. The computing apparatus of claim 14, the instructions further to cause the processing device to:
recommend, based on the usage pattern, a locking strategy for the transactional object; and
modify a current locking strategy of the transactional object responsive to a determination that the current locking strategy is different from the recommended locking strategy.

19. The computing apparatus of claim 18, wherein modifying the current locking strategy comprises changing the current locking strategy from a read lock to a write lock or changing the current locking strategy from a write lock to a read lock.

\* \* \* \* \*